United States Patent
Stieglitz et al.

(10) Patent No.: US 11,485,184 B2
(45) Date of Patent: Nov. 1, 2022

(54) THREE-POINT SUSPENSION LINK AND PRODUCTION METHOD FOR A THREE-POINT SUSPENSION LINK

(71) Applicant: ZF Friedrichshafen AG, Friedrichshafen (DE)

(72) Inventors: Andre Stieglitz, Osnabrück (DE); Ingolf Müller, Minfeld (DE); Philipp Bauer, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 44 days.

(21) Appl. No.: 16/635,411

(22) PCT Filed: Jul. 16, 2018

(86) PCT No.: PCT/EP2018/069189
§ 371 (c)(1),
(2) Date: Jan. 30, 2020

(87) PCT Pub. No.: WO2019/025165
PCT Pub. Date: Feb. 7, 2019

(65) Prior Publication Data
US 2020/0369105 A1    Nov. 26, 2020

(30) Foreign Application Priority Data
Aug. 4, 2017    (DE) .................... 10 2017 213 564.6

(51) Int. Cl.
*B60G 7/00* (2006.01)
*B29C 53/56* (2006.01)
(52) U.S. Cl.
CPC ............ *B60G 7/001* (2013.01); *B29C 53/564* (2013.01); *B60G 7/008* (2013.01);
(Continued)

(58) Field of Classification Search
CPC .......... B60G 7/001; B60G 7/008; B60G 7/00; B60G 2206/11; B60G 2206/124;
(Continued)

(56) References Cited

U.S. PATENT DOCUMENTS 369,883 A * 9/1887 Richards ................. F16C 7/023
74/594
3,370,483 A * 2/1968 Ditlinger ............... B64C 27/327
416/135
(Continued)

FOREIGN PATENT DOCUMENTS

DE   10 2014 214 827   2/2016
DE   20 2016 103191    7/2016
(Continued)

*Primary Examiner* — Paul N Dickson
*Assistant Examiner* — Timothy Wilhelm
(74) *Attorney, Agent, or Firm* — Cozen O'Connor (57) ABSTRACT

A three-point suspension link for a chassis of a vehicle has two arms and a central bearing area. Each arm has a bearing area. The three-point suspension link comprises two load-introducing elements, a central load-introducing element, a stabilization layer, a core element and a supporting winding. The stabilization layer and the supporting winding are formed from a fiber reinforced plastic composite material. A load-introducing element is arranged at every bearing area. The central load-introducing element is arranged at the central bearing area. The core element is surrounded by the stabilization layer in a subarea. The supporting winding surrounds the load-introducing elements, the central load-introducing element, the stabilization layer and the core element in a subarea.

17 Claims, 3 Drawing Sheets

(52) U.S. Cl.
CPC .... *B60G 2206/11* (2013.01); *B60G 2206/124* (2013.01); *B60G 2206/7101* (2013.01)

(58) Field of Classification Search
CPC ........ B60G 2206/7101; B60G 2206/85; B60G 2206/82013; B60G 2204/41; B29C 53/564; F16F 1/3842; Y10T 29/49
See application file for complete search history.

(56) References Cited

U.S. PATENT DOCUMENTS

| | | | | |
|---|---|---|---|---|
| 3,408,124 A * | 10/1968 | James | F16C 11/083 | 403/288 |
| 3,411,379 A * | 11/1968 | Deyerling | B29C 53/564 | 74/579 R |
| 3,475,988 A * | 11/1969 | Ditlinger | F16C 7/026 | 416/135 |
| 3,722,931 A * | 3/1973 | Uchida | F16C 11/0619 | 280/93.508 |
| 4,183,261 A * | 1/1980 | Eiselbrecher | B29C 70/56 | 24/265 EE |
| 4,300,410 A * | 11/1981 | Raghupathi | B29C 53/564 | 428/377 |
| 4,353,267 A * | 10/1982 | Robert | B29C 53/564 | 74/579 R |
| 4,411,114 A * | 10/1983 | Wurtinger | F16C 7/026 | 403/267 |
| 4,414,860 A * | 11/1983 | Brunsch | F16C 7/026 | 74/579 E |
| 4,552,035 A * | 11/1985 | Skipper | B64C 27/327 | 59/84 |
| 4,603,084 A * | 7/1986 | Drachenberg | F16C 7/026 | 428/377 |
| 4,650,620 A * | 3/1987 | Owen | B29C 53/821 | 264/257 |
| 4,671,336 A * | 6/1987 | Anahara | F16C 7/026 | 74/579 E |
| 4,704,918 A * | 11/1987 | Orkin | F16C 7/026 | 464/181 |
| 4,772,044 A * | 9/1988 | Booher | B29C 70/52 | 267/47 |
| 4,811,626 A * | 3/1989 | Bezin | B62M 3/00 | 74/594.1 |
| 4,841,801 A * | 6/1989 | Tice | F16C 7/026 | 123/197.3 |
| 4,857,124 A * | 8/1989 | Shobert | B29C 53/68 | 156/149 |
| 4,873,889 A * | 10/1989 | Ditlinger | B29C 53/56 | 464/69 |
| 4,992,313 A * | 2/1991 | Shobert | B29C 63/24 | 428/36.1 |
| 5,267,751 A * | 12/1993 | Hiramoto | F16F 1/368 | 280/124.134 |
| 5,374,780 A * | 12/1994 | Pazdirek | B29C 70/86 | 174/209 |
| 5,397,272 A * | 3/1995 | Smiley | F16C 3/026 | 464/181 |
| 5,406,033 A * | 4/1995 | Pazdirek | H01B 17/325 | 174/209 |
| 5,435,869 A * | 7/1995 | Christensen | B29C 70/347 | 156/169 |
| 5,556,081 A * | 9/1996 | Miura | B29C 70/86 | 267/47 |
| 5,690,034 A * | 11/1997 | Schahl | B29C 70/86 | 105/199.1 |
| 5,788,263 A * | 8/1998 | VanDenberg | B60G 21/051 | 280/124.157 |
| 6,116,113 A * | 9/2000 | Pazdirek | B29C 53/585 | 57/230 |
| 6,152,433 A * | 11/2000 | Hettich | B60G 7/001 | 180/352 |
| 6,202,505 B1 * | 3/2001 | Auberon | F16C 7/026 | 74/579 R |
| 6,231,264 B1 * | 5/2001 | McLaughlin | F16C 11/0614 | 403/135 |
| 6,305,699 B1 * | 10/2001 | Konig | B60G 7/001 | 280/124.133 |
| 6,324,940 B1 * | 12/2001 | Pazdirek | F16C 7/026 | 57/230 |
| 6,371,682 B1 * | 4/2002 | Maughan | B62D 7/16 | 280/93.508 |
| 6,564,675 B1 * | 5/2003 | Jiang | B62K 19/16 | 74/594.1 |
| 6,959,935 B2 * | 11/2005 | Buhl | B60G 7/001 | 403/135 |
| 7,013,753 B2 * | 3/2006 | Valle | B62K 19/16 | 74/594.1 |
| 7,028,998 B2 * | 4/2006 | Daily | B60G 21/055 | 267/273 |
| 7,205,251 B2 * | 4/2007 | Wellman | B29C 70/081 | 442/373 |
| 7,753,384 B2 * | 7/2010 | Kunze | B60G 9/00 | 280/124.143 |
| 7,798,503 B2 * | 9/2010 | McLaughlin | B60G 7/003 | 267/66 |
| 7,918,439 B2 * | 4/2011 | Morales Arnaez | B29C 45/2673 | 267/141.3 |
| 7,921,629 B2 * | 4/2011 | Scholten | D04H 3/045 | 57/13 |
| 7,980,575 B2 * | 7/2011 | Quaing | B60G 9/00 | 180/358 |
| 8,024,993 B2 * | 9/2011 | Dal | B62K 19/16 | 74/594.1 |
| 8,617,336 B2 * | 12/2013 | Kawamura | B29C 53/564 | 156/173 |
| 8,714,571 B2 * | 5/2014 | Nataraj | B60G 7/005 | 280/124.13 |
| 8,777,162 B2 * | 7/2014 | Benthien | F16C 7/026 | 244/131 |
| 8,777,244 B2 * | 7/2014 | Seethaler | B60G 3/06 | 280/124.17 |
| 8,783,993 B2 * | 7/2014 | Brunneke | F16F 1/3842 | 280/93.511 |
| 8,793,965 B2 * | 8/2014 | Kurath-Grollmann | B29D 24/002 | 52/843 |
| 8,863,616 B2 * | 10/2014 | Ciavatta | B62M 3/00 | 74/594.1 |
| 9,090,289 B2 * | 7/2015 | Heise | B62D 29/001 | |
| 9,168,801 B2 * | 10/2015 | Dicke | B60G 7/001 | |
| 9,259,878 B2 * | 2/2016 | Valembois | B29C 70/207 | |
| 9,393,850 B2 * | 7/2016 | Kuroda | B60G 21/0551 | |
| 9,404,249 B2 * | 8/2016 | Langone | B29C 70/32 | |
| 9,511,642 B2 * | 12/2016 | Scheper | B60G 7/008 | |
| 9,555,683 B2 * | 1/2017 | Eismann | B60G 9/022 | |
| 9,610,818 B2 * | 4/2017 | Mark | F16F 1/3849 | |
| 9,616,725 B2 * | 4/2017 | Kuroda | B60G 7/005 | |
| 9,751,564 B2 * | 9/2017 | Muehlhausen | B62D 29/005 | |
| 9,937,657 B2 * | 4/2018 | Wakeman | B32B 5/28 | |
| 10,105,916 B2 * | 10/2018 | Dal Prà et al. | B62M 3/00 | |
| 10,189,326 B2 * | 1/2019 | Steber | B29C 66/1284 | |
| 10,220,666 B2 * | 3/2019 | Kuroda | B60G 21/055 | |
| 10,350,951 B2 * | 7/2019 | Meyer | B29C 70/443 | |
| 10,487,869 B2 * | 11/2019 | Beale | B62D 29/048 | |
| 10,493,703 B2 * | 12/2019 | Yasui | B29C 70/30 | |
| 10,549,592 B2 * | 2/2020 | Meyer | B29C 45/14336 | |
| 10,850,329 B2 * | 12/2020 | Tenhaeff | B33Y 80/00 | |
| 10,864,788 B2 * | 12/2020 | Müller | B60G 7/001 | |
| 10,919,359 B2 * | 2/2021 | Rapp | B60G 21/0551 | |
| 10,974,559 B2 * | 4/2021 | Mainz | B29C 70/081 | |
| 2001/0009321 A1 * | 7/2001 | Toyoshima | B60G 9/00 | 248/635 |
| 2003/0160414 A1 * | 8/2003 | Pincerato | B60G 7/001 | 280/93.51 |
| 2005/0044984 A1 * | 3/2005 | Jones | E04C 3/29 | 74/579 R |
| 2005/0281610 A1 * | 12/2005 | MacLean | F16C 11/0633 | 403/56 |

(56) References Cited

U.S. PATENT DOCUMENTS

| | | | | |
|---|---|---|---|---|
| 2006/0244232 | A1* | 11/2006 | Cortez | B60G 7/00 280/124.109 |
| 2007/0186719 | A1* | 8/2007 | Ciavatta | B29C 70/86 74/594.1 |
| 2007/0199403 | A1* | 8/2007 | Ciavatta | F16C 3/22 74/594.1 |
| 2007/0264470 | A1* | 11/2007 | Wellman | B29C 70/086 428/105 |
| 2009/0014977 | A1* | 1/2009 | Molenaar | B60G 7/001 280/124.134 |
| 2012/0305173 | A1* | 12/2012 | Masson | B29C 70/545 156/185 |
| 2015/0030806 | A1* | 1/2015 | Fink | B32B 15/14 428/116 |
| 2015/0158361 | A1* | 6/2015 | Eismann | B60G 9/00 280/124.116 |
| 2016/0355914 | A1* | 12/2016 | Takemura | C22F 1/047 |
| 2019/0133807 | A1* | 5/2019 | Siewert | A61F 5/0127 |
| 2019/0160903 | A1* | 5/2019 | Schramm | B29C 70/345 |
| 2020/0180376 | A1* | 6/2020 | Stieglitz | B60G 7/001 |
| 2020/0223273 | A1* | 7/2020 | Kwon | B29C 45/14754 |
| 2020/0307333 | A1* | 10/2020 | Reddehase | B60G 7/02 |

FOREIGN PATENT DOCUMENTS

| | | |
|---|---|---|
| DE | 10 2015 215077 | 2/2017 |
| DE | 10 2015 218026 | 3/2017 |
| JP | H10 109511 | 4/1998 |

* cited by examiner

THREE-POINT SUSPENSION LINK AND PRODUCTION METHOD FOR A THREE-POINT SUSPENSION LINK

CROSS REFERENCE TO RELATED APPLICATIONS

This is a U.S. national stage of application No. PCT/EP2018/069189, filed on Jul. 16, 2018. Priority is claimed on German, Application No.: 10 2017 213 564.6, filed Aug. 4, 2017, the content of which is incorporated herein by reference.

FIELD OF THE INVENTION

The present invention is directed to a three-point suspension link having a stabilizing layer, a supporting winding and a core structure and to a production method for a three-point suspension link.

Three-point suspension links are used in tractor units in the field of commercial vehicles to link the axle to the structural frame. These three-point suspension links contribute in large measure to the transverse guidance and longitudinal guidance of the axle. A three-point suspension link guides the axle in an upper link plane and influences the driving characteristics of the commercial vehicle. During driving operation of the commercial vehicle, every three-point suspension link is exposed to high longitudinal loads and high transverse loads as well as rolling movements which occur, e.g., during cornering of the commercial vehicle. This imposes special requirements with respect to stiffness of the three-point suspension link.

A multipoint suspension link which is formed substantially from a fiber reinforced plastic composite structure is known from DE102014214827A1. The fiber reinforced plastic composite structure is formed integrally and by bonding connection without a reinforcement structure.

It is an object of the present invention to provide an improved three-point suspension link. This three-point suspension link shall be suitable for lightweight construction and shall therefore have a low mass.

A three-point suspension link for a chassis of a vehicle comprises two arms and a central bearing area. Each arm has a bearing area. The three-point suspension link comprises two load-introducing elements, a central load-introducing element, a stabilization layer, a core element and a supporting winding. The stabilization layer and the supporting winding are formed from a fiber reinforced plastic composite material (FRP). A load-introducing element is arranged at every bearing area. The central load-introducing element is arranged at the central bearing area. The core element is surrounded by the stabilization layer in a subarea. The supporting winding surrounds the load-introducing elements, the central load-introducing element, the stabilization layer and the core element in a subarea. The vehicle is preferably a commercial vehicle but, alternatively, can be a passenger vehicle.

The two load-introducing elements are formed uniformly with respect to one another. The central load-introducing element can be formed from the same material as the two load-introducing elements. It will be understood that the central load-introducing element can be formed from a different material than the two load-introducing elements.

Each load-introducing element has a bearing receptacle which is suitable for receiving a bearing. These bearing receptacles preferably have a circular cross section. The bearing can be a rubber-metal bearing, for example. If the three-point suspension link is used in a chassis of a vehicle, these bearings serve to support the three-point suspension link at a vehicle body, e.g., at a frame structure. The bearing receptacles of the two load-introducing elements have, in each instance, a bearing axis. These bearing axes preferably lie in the same plane. This plane is perpendicular to a central plane of the three-point suspension link.

The three-point suspension link is preferably formed symmetrical to the central plane. Every load-introducing element is arranged at an arm of the three-point suspension link and limits the latter toward a side opposite the central bearing area. A first load-introducing element is arranged at a first arm of the three-point suspension link at the bearing area thereof. A second load-introducing element is arranged at a second arm of the three-point suspension link at the bearing area thereof. In driving operation, loads act upon these bearings which are operatively connected to the respective load-introducing elements. These loads are conveyed to the load-introducing elements via the receptacles of the load-introducing elements. These loads are conveyed from the load-introducing elements to the stabilization layer and to the supporting winding.

The central load-introducing element has a bearing receptacle which is suitable for receiving a bearing. The bearing can be a rubber-metal bearing, for example. If the three-point suspension link is used in a chassis of a vehicle, this bearing serves to connect the three-point suspension link to an axle body. The bearing receptacle of the central load-introducing element is preferably formed cylindrical. The bearing receptacle of the central load-introducing element preferably has a bearing axis which lies in the same plane in which the bearing axes of the two load-introducing elements extend. During a driving operation, loads act upon the bearing that is connected to the central load-introducing element when the three-point suspension link is used in a vehicle. These loads are received by this bearing and conveyed to the central load-introducing element which in turn introduces the loads into the stabilization layer and into the supporting winding.

The basic geometric form of the three-point suspension link is provided by the core element. Accordingly, the core element has two arms and the central bearing area. The core element is formed such that it has a lateral surface and two cover surfaces. More exactly, the lateral surface of the core element has two portions. A first portion of the lateral surface is arranged in the inner area of the two arms, and a second portion of the lateral surface is arranged in the outer area of the two arms.

The core element is produced during the production process by a core structure. The core structure can be removable or, alternatively, can be formed to be permanent so that the core element is formed either free of material or from the same material as the core structure. If the core element is formed free of material, the three-point suspension link is formed as a hollow structure. If the core element is formed from a material, it is formed as a solid structure.

The stabilization layer is formed from an FRP. For example, the stabilization layer can be formed from GRP, CRP, ARP or from another suitable FRP. The stabilization layer is preferably formed as an FRP laminate from a plurality of fiber layers. The stabilization layer is formed such that it surrounds the core element in a subarea. This subarea is the lateral surface or one or more portions of the lateral surface of the core element; that is, the stabilization layer can be formed of one or more parts. For example, the stabilization layer can have two or three parts. The stabilization layer can extend, for example, from the first bearing area along the first arm to the central bearing area and from the second bearing area along the second arm to the central bearing area. In this case, the stabilization layer surrounds the second portion of the lateral surface. In addition, the stabilization layer can extend from the first bearing area along the first arm via the central bearing area to the second bearing area. In this case, the stabilization layer surrounds the first portion of the lateral surface. The stabilization layer can either be connected to the load-introducing elements and to the central load-introducing element in a planar manner or the fibers of the stabilization layer can run around the two load-introducing elements and the central load-introducing element.

The stabilization layer serves to receive the transverse loads which occur to a great degree during a driving operation when the three-point suspension link is used in a vehicle. Further, the stabilization layer serves to receive longitudinal loads occurring along the arms during this driving operation. The stabilization layer further serves to receive bending loads which occur during this driving operation and which can be brought about, e.g., by the transverse loads and/or longitudinal loads.

The supporting winding is formed from an FRP. For example, the supporting winding can be formed from GRP, CRP, ARP or from another suitable FRP. The supporting winding is formed from unidirectional plastic composite fiber strands which are preferably endless-fiber-reinforced. For example, a preimpregnated FRP prepreg material with a duromer or thermoplastic matrix can be used to form the supporting winding (e.g., towpreg or tape). This is economical and also advantageous for the production of the three-point suspension link because this material is suitable for high winding speeds.

The supporting winding surrounds the load-introducing elements, the central load-introducing element, the stabilization layer and the core element in a subarea. In other words, the supporting winding is wrapped around the load-introducing elements, the central load-introducing element, the stabilization layer and the core element so that the supporting winding determines an outer shape of the three-point suspension link. The supporting winding accordingly forms the two arms and the central bearing area connecting the latter. The supporting winding is operatively connected to the stabilization layer, to the two load-introducing elements and to the central load-introducing element. More precisely, the supporting winding is bondingly connected to the stabilization layer. If the core element is not formed free of material, the supporting winding is likewise operatively connected to the core element. "Operatively connected" means that two components are directly connected to one another, this connection being so constituted that forces and moments can be conveyed between the two components. The supporting winding is formed by a combination of circumferential windings and cross-windings. This provides a partially thick-walled and substantially closed composite laminate.

The supporting winding serves to receive the transverse loads which occur to a great degree during a driving operation when the three-point suspension link is used in a vehicle. Further, the supporting winding serves to receive longitudinal loads occurring along the arms during this driving operation. The supporting winding and the stabilization layer accordingly complement one another with respect to their action.

If the three-point suspension link is used in a vehicle, loads act upon the bearings which are connected to the load-introducing elements. Loads act on the bearing which is connected to the central load-introducing element. Accordingly, tensile stresses, compressive stresses and bending stresses occur in the three-point suspension link. As a result of the construction of the three-point suspension link from multiple materials as described, the fiber strands of the supporting winding are oriented in load direction. Due to the fact that the arms are formed by the stabilization layer and the supporting winding which are bondingly connected to one another, the three-point suspension link has a high area moment of inertia so that bending stresses occurring at the arms are reduced. The arms of the three-point suspension link have a high strength. The tensile stresses and compressive stresses are accommodated by the stabilization layer and by the supporting winding.

The three-point suspension link shown here is advantageous in that it has a lower mass than a conventional three-point suspension link of metal material. Accordingly, the three-point suspension link has a high potential for a lightweight construction without compromising strength in the relevant load direction. Therefore, when the three-point suspension link is used in a vehicle, the total mass of the vehicle is reduced, which leads to fuel economy and to an increase in the possible useful load.

According to one embodiment, the stabilization layer has a unidirectional fiber direction which is oriented from the bearing areas to the central bearing area. This means that the fiber direction of the stabilization layer is oriented along the arms. Accordingly, the fiber direction is oriented from the first bearing area to the central bearing area and from the second bearing area to the central bearing area. Because of this unidirectional fiber direction, the stabilization layer is especially suited to receive the loads occurring during a driving operation, e.g., transverse loads and longitudinal loads, when the three-point suspension link is used in a vehicle. The fiber direction of the stabilization layer is accordingly load-adapted.

According to a further embodiment, the stabilization layer is formed of at least two parts. The stabilization layer can, of course, also have more than two parts. A first part of the stabilization layer extends from the first bearing area along the first arm to the central bearing area, and a second part of the stabilization layer extends from the second bearing area along the second arm to the central bearing area. When the stabilization layer has more than two parts, a third part of the stabilization layer extends from the first bearing area along the first arm via the central bearing area and along the second arm to the second bearing area.

During the production process, the parts of the stabilization layer can either be parts which are already hardened or can be wet with a highly viscous, sticky matrix. If the parts are wet, they are preferably cured together with the supporting winding during the production process to form the bonding connection between the stabilization layer and the supporting winding.

According to a further embodiment, the central load-introducing element and the load-introducing elements are formed from a metal material. For example, the central load-introducing element and each load-introducing element can be formed from aluminum, from a steel, from titanium or from another suitable metal material. The central load-introducing element and the two load-introducing elements can be formed from the same material. Alternatively, only the two load-introducing elements can be formed from the same material. The load-introducing elements and the central load-introducing element are preferably produced by an extrusion process with a minimal amount of cutting machining.

According to a further embodiment, the central load-introducing element and the load-introducing elements are formed from a fiber reinforced plastic composite material. For example, they can be formed from a long-fiber-reinforced duromer, e.g., SMC (sheet molding compound) or from another suitable FRP. The central load-introducing element and the two load-introducing elements can be formed from the same material. Alternatively, only the two load-introducing elements can be formed from the same material. The load-introducing elements and the central load-introducing element are preferably produced by an extrusion process with a minimal amount of cutting machining.

According to a further embodiment, fiber strands of the supporting winding run in the area of the arms in a parallel and elongated manner to the respective arm. That is, at least one fiber strand at each arm runs in a parallel and elongated manner to this arm. However, a substantial portion of or the majority of fiber strands of the supporting winding at each arm runs in a parallel and elongated manner to this arm.

In order to achieve this orientation of the fiber strands, the core structure has at least one winding aid and/or a bent and planar shape at the central bearing area during the production process for the three-point suspension link so that the fiber strands can be selectively deflected and do not slip. For example, the core structure at the central bearing area can have three or more surfaces which are perpendicular to the plane defined by the bearing axes of the bearing receptacles of the load-introducing elements and of the central load-introducing element. These surfaces have an angle relative to one another. For example, one or more of these surfaces can be arranged parallel to a bearing axis of a bearing receptacle of a load-introducing element. When the supporting winding is wound during the production process, the fiber strands are arranged perpendicular to the surface contacted by them.

This arrangement of the fiber strands of the supporting winding is advantageous in that a load-adapted laminate is formed in this way and the fiber strands take the primary load path.

According to a further embodiment, the load-introducing elements and the central load-introducing element have the same orientation. That is, the bearing axes of the bearing receptacles of the load-introducing elements and of the central load-introducing element are arranged with respect to one another in such a way that they lie in a plane. The bearing axis of the bearing receptacle of the central load-introducing element is not perpendicular to a plane that is defined by the bearing axes of the bearing receptacles of the load-introducing elements.

According to a further embodiment, the core element is formed from a plastic foam material. This plastic foam material can be, for example, foamed polyurethane, polypropylene, polycarbonate or another suitable plastic. This is advantageous in that this plastic foam material has a low mass. Accordingly, the entire three-point suspension link has a low mass. In addition, this plastic foam material is produced and further processed in an economical and simple manner.

According to a further embodiment, the core element is formed from a metal foam material. This metal foam material can be, for example, foamed aluminum, a bismuth-based metal alloy or another suitable metal material. This is advantageous in that this metal foam material has a low mass. Accordingly, the entire three-point suspension link has a low mass.

According to a further embodiment, the core element is formed free of material. This means that the three-point suspension link is formed to be hollow. This is achieved during the production process by using a soluble core structure which is surrounded by the stabilization layer and by the supporting winding in a subarea. This core structure is removed after the supporting winding and possibly the stabilization layer are cured so that no material of the core structure remains in the three-point suspension link. For example, a soluble core structure comprising a metal foam material, e.g., a bismuth-based foamed metal alloy, or a salt-based soluble core structure can be used.

This is advantageous in that, in contrast to a conventional three-point suspension link comprising a metal material, the three-point suspension link has a very low mass due to the material-free core element. Nevertheless, the three-point suspension link has a comparable stiffness.

In a method for producing a three-point suspension link that has already been described above, a core structure is provided. This core structure forms the basic form of the three-point suspension link. Each load-introducing element is arranged at a bearing area and integrated into the core structure. For example, the load-introducing elements can be connected to the core structure by positive engagement, e.g., can be inserted on or into the core structure, and/or bondingly connected to the core structure. The central load-introducing element is arranged at the central bearing area and is integrated into the core structure. The central load-introducing element can be connected to the core structure by positive engagement and/or bonding engagement. For example, the core structure can have a bore hole into which the central load-introducing element is inserted or to which the central load-introducing element is glued.

The stabilization layer is connected to the core structure so that it surrounds the core structure in a subarea, and this connection is carried out by an adhesive connection. Accordingly, the stabilization layer is bondingly connected to the core structure. The supporting winding is wound around the core structure, the stabilization layer, the load-introducing elements and the central load-introducing element so that the stabilization layer is fixed in its position and the supporting winding is guided in such a way that fiber strands of the supporting winding in the area of the arms run in a parallel and elongated manner to the respective arm.

The winding of the supporting winding is carried out, e.g., by a three-dimensional winding process. The fiber strands of the supporting winding are wrapped around the central load-introducing element, around the load-introducing elements, around the stabilization layer and around the core structure and are operatively connected thereto. A planar supporting winding structure is formed at the cover surfaces of the three-point suspension link by winding. At the lateral surface of the three-point suspension link, the fiber strands of the supporting winding are at an angle to one another. After winding is concluded, the supporting winding is available as a partially thick-walled and substantially closed composite laminate. Further, the supporting winding fixes the central load-introducing element and the two load-introducing elements in their spatial position. Lastly, the three-point suspension link is cured.

According to one embodiment, the stabilization layer is wet when connected to the core structure. This means that the stabilization layer exists as a preimpregnated fiber structure which is provided with a highly viscous, sticky matrix. This creates a bonding adhesive connection between the core structure and the stabilization layer when the stabilization layer is connected to the core structure. After the supporting winding has been wrapped around the core structure, the stabilization layer, the load-introducing elements and the central load-introducing element, the supporting winding and the stabilization layer are cured together. Accordingly, a bonding connection is provided between the stabilization layer and the supporting winding. After this curing, the stabilization layer is fixed in its spatial position by the supporting winding.

According to a further embodiment, the stabilization layer is cured during the connection to the core structure. Accordingly, the stabilization layer already has the aimed-for geometry during the connection to the core structure and need not be cured together with the supporting winding. After the supporting winding is cured, the stabilization layer is fixed in its spatial position by the supporting winding.

According to a further embodiment, the supporting winding is wound by a three-dimensional winding process. In so doing, either the core structure which is connected to the stabilization layer, the load-introducing elements and the central load-introducing element can be rotated and the fiber strands of the supporting winding can be fed in a stationary manner, or the core structure which is connected to the stabilization layer, the load-introducing elements and the central load-introducing element is held stationary and the fiber strands of the supporting winding are wrapped around the latter. Two handling robots, for example, can be used for this purpose.

According to a further embodiment, the core structure has winding aids so that the fiber strands of the supporting winding are selectively deflected with predetermined spacing during the winding process. The winding aids can be surfaces, for example, at a determined angle relative to one another. The winding aids can also be projections, undercuts or recesses, for example.

According to a further embodiment, the core structure is formed such that it remains in the three-point suspension link after the curing of the three-point suspension link so that the core structure forms a core element of the three-point suspension link. In this case, the core structure is formed from a permanent, i.e., indissoluble, plastic foam material, or from a permanent, i.e., indissoluble, metal foam material. The plastic foam material can be, for example, foamed polyurethane, polypropylene, polycarbonate or another suitable plastic. The metal foam material can be, for example, foamed aluminum, a bismuth-based metal alloy or another suitable metal material.

According to a further embodiment, the core structure is formed to be soluble and is removed from the three-point suspension link after the three-point suspension link is cured so that a material-free core element is formed. For example, the core structure can comprise a metal foam material, e.g., a foamed bismuth-based metal alloy or a soluble salt-based core structure. The removal of the core structure can be carried out, for example, by rinsing with a fluid. After the core structure is disengaged, the supporting winding, stabilization layer, load-introducing elements and central load-introducing element remain in their spatial position.

BRIEF DESCRIPTION OF THE DRAWINGS

Various embodiment examples and details of the invention will be described more fully with reference to the figures in which.

DETAILED DESCRIPTION OF THE PRESENTLY PREFERRED EMBODIMENTS

Figure 1:
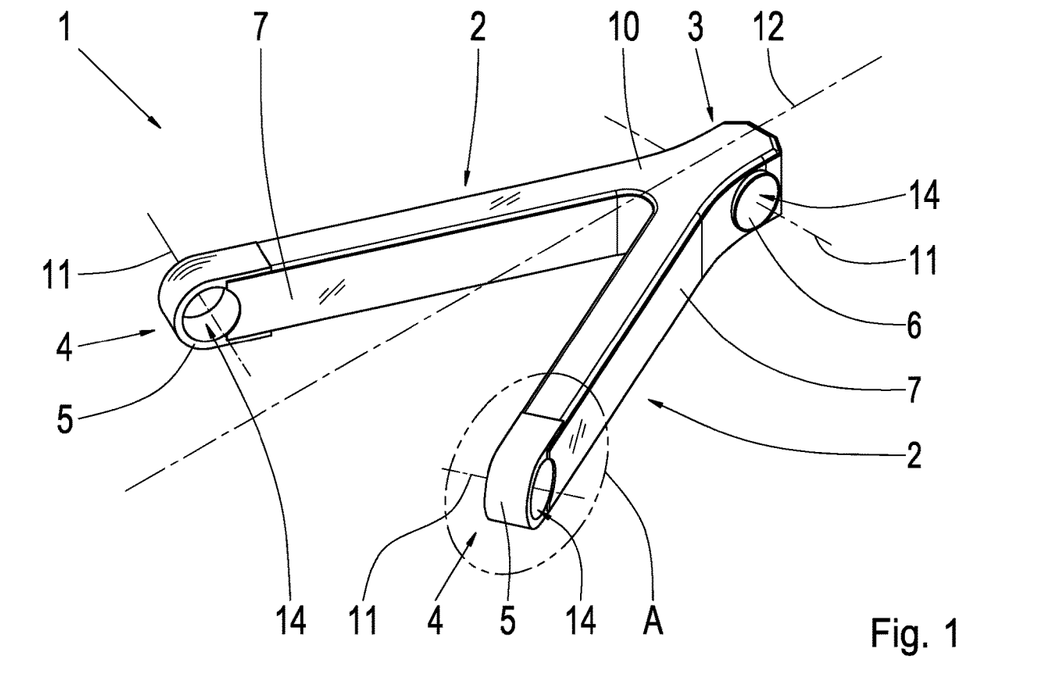
FIG. 1 is a schematic diagram of a core structure, a central load-introducing element and two load-introducing elements of a three-point suspension link according to an embodiment of the present invention.

FIG. 1 shows a schematic diagram of a core structure 10, a stabilization layer 7, a central load-introducing element 6 and two load-introducing elements 5 of a three-point suspension link 1 according to an embodiment example. The three-point suspension link 1 in the present diagram is not finished but rather is still in the production process.

The core structure 10 forms the basic form of the three-point suspension link 1. Like the three-point suspension link 1, the core structure 10 has a central bearing area 3 and two arms 2. Each arm 2 has a bearing area 4. A first arm 2 has a first bearing area 4. A second arm 2 has a second bearing area 4. Each arm 2 is connected to the central bearing area 3. Each bearing area 4 limits its corresponding arm 2 toward a side opposite the central bearing area 3. The three-point suspension link 1 is formed symmetrical to a central plane, of which only a central axis 12 is shown here. The three-point suspension link 1 has two cover surfaces and a lateral surface. The core structure 10 is formed from a plastic foam material.

A load-introducing element 5 is arranged at each bearing area 4. These load-introducing elements 5 are formed uniformly with respect to one another. Each load-introducing element 5 has a bearing receptacle 14 which is suitable for receiving a bearing when the three-point suspension link 1 is used in a vehicle. Each bearing receptacle 14 has a circular cross-section. Further, each bearing receptacle 14 has a bearing axis 11. The bearing axes 11 of the two load-introducing elements 5 are arranged in the same plane. This plane is perpendicular to the central point in which the central axis 12 is arranged. The load-introducing elements 5 are operatively connected to the core structure 10 and are integrated therein.

The central load-introducing element 6 is arranged at the central bearing area 3. To this end, the core structure 10 has a bore hole. The central load-introducing element 6 is operatively connected to the core structure 10 and is integrated therein. The central load-introducing element 6 has a bearing receptacle 14 which has a circular cross-section. Bearing receptacle 14 further has a bearing axis 11. This bearing axis 11 of the bearing receptacle 14 of the central load-introducing element 6 is arranged in the same plane as bearing axes 11 of bearing receptacles 14 of load-introducing elements 5. Therefore, load-introducing elements 5 and central load-introducing element 6 have the same orientation. The load-introducing elements 5 and the central load-introducing element 6 are formed from the same material, e.g., from an FRP or from a metal material.

The stabilization layer 7 comprises three parts and is formed as a laminate. A first part of the stabilization layer 7 extends from the first bearing area 4 along the first arm 2 to the central bearing area 3. A second part of the stabilization layer 7 extends from the second bearing area 4 along the second arm 2 to the central bearing area 3. A third part of the stabilization layer 7 extends from the first bearing area 4 along the first arm 2 via the central bearing area 3 along the second arm 2 to the second bearing area 4. The first part and the second part of the stabilization layer 7 accordingly form an outer lateral surface of the three-point suspension link 1. The third part of the stabilization layer 7 accordingly forms an inner lateral surface of the three-point suspension link 1. The stabilization layer 7 has a unidirectional fiber direction which is shown in more detail in FIG. 2 by enlargement area A.

The stabilization layer 7 is connected to the core structure 10 by an adhesive connection. Further, the stabilization layer 7 is connected in a planar manner to the two load-introducing elements 5 by an adhesive connection. Further, the stabilization layer 7 is connected in a planar manner to the central load-introducing element 6 by an adhesive connection. Accordingly, the stabilization layer 7 surrounds the core structure 10 in a subarea.

In the central bearing area 3, the core structure 10 has three surfaces at its side remote of the bearing areas 4. The surfaces are perpendicular to the plane that is defined by the bearing axes 11 of the load-introducing elements 5 and of the central load-introducing element 6. These surfaces are winding aids. A first surface of these surfaces is parallel to the bearing axis 11 of the bearing receptacle 14 of the first load-introducing element 5. A second surface of these surfaces is parallel to the bearing axis 11 of the bearing receptacle 14 of the second load-introducing element 5. A third surface of these surfaces is parallel to the bearing axis 11 of the bearing receptacle 14 of the central load-introducing element 6. These three surfaces are at angles relative to one another. As a result of this arrangement of the surfaces relative to one another, the fiber strands of the supporting winding can be selectively guided and deflected in the further production process. This is shown in more detail in FIG. 3.

Figure 2:
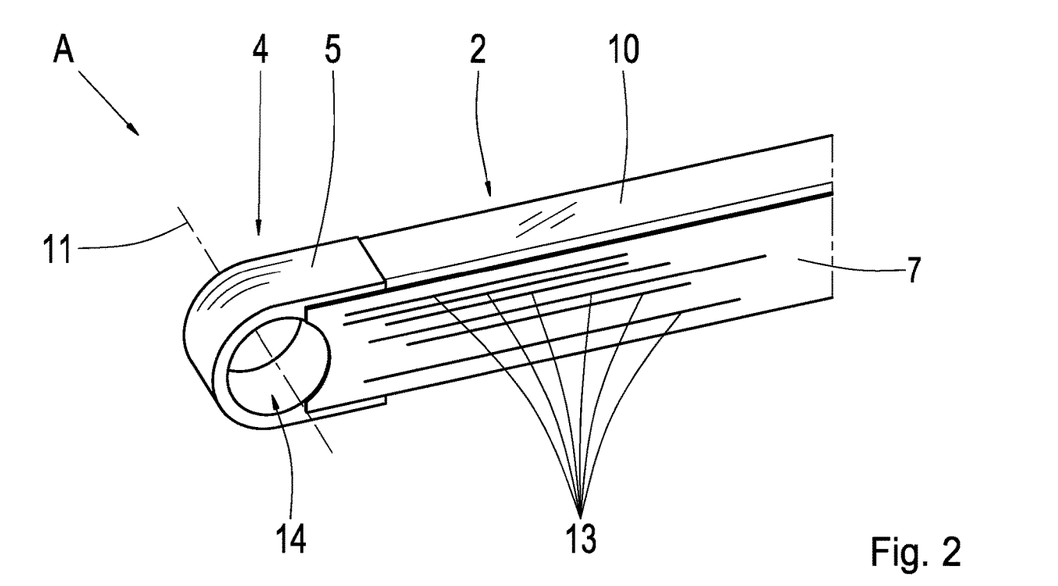
FIG. 2 is a schematic detailed view of the enlargement area A from FIG. 1.

FIG. 2 shows a schematic detailed diagram of enlargement area A from FIG. 1. It can be clearly discerned that the fiber direction 13 of the stabilization layer 7 is unidirectional. Further, the fiber direction 13 runs along the longitudinal extension of arm 2 from the bearing area 4 to the central bearing area 3. Because of the unidirectional fiber direction 13, the stabilization layer 7 is especially suitable for receiving transverse loads and longitudinal loads occurring during a driving operation when the three-point suspension link 1 is used in a vehicle.

Figure 3:
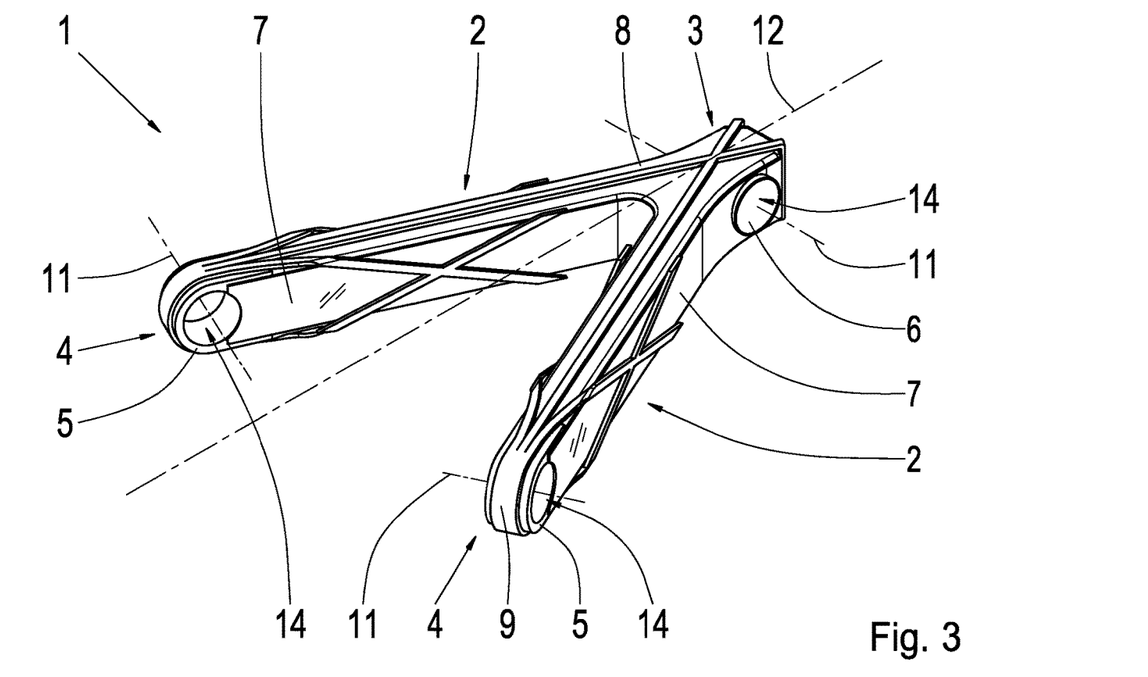
FIG. 3 is a schematic diagram of the finished three-point suspension link according to the embodiment example from FIG. 1 and FIG. 2.

FIG. 3 shows a schematic diagram of the finished three-point suspension link 1 according to the embodiment example from FIG. 1 and FIG. 2. The three-point suspension link 1 is shown here after the curing of the supporting winding 9. For better clarity, the supporting winding 9 is shown incompletely and in a highly schematic manner. Since the core structure 10 from FIG. 1 and FIG. 2 is a permanent core structure 10 and is not detachable, this core structure forms the core element 8 after curing. Accordingly, core element 8 is formed from the same material as the core structure in FIG. 1 and FIG. 2.

The supporting winding 9 is formed from an FRP. It can be clearly discerned that the supporting winding 9 surrounds the core element 8, the stabilization layer 7, the load-introducing elements 5 and the central load-introducing element 6 in a subarea. Accordingly, the supporting winding 9 is wrapped around stabilization layer 7, around the load-introducing elements 5 and around the central load-introducing element 6. The supporting winding 9 additionally fixes the stabilization layer 7 in its position. A fiber strand of the supporting winding 9 depicted here extends at each arm 2 in a parallel and elongated manner with respect to this arm 2. It will be understood that a plurality of fiber strands of the supporting winding 9 at each arm 2 run in a parallel and elongated manner to this arm 2. This is made possible by the shape of the central bearing area 3 by the three surfaces, which has already been shown referring to FIG. 1. The three surfaces are winding aids. The fiber strands of the supporting winding 9 are oriented in load direction. Due to the stabilization layer 7 and the supporting winding 9 which are connected to one another at the arms 2 of the three-point suspension link 1, the three-point suspension link has a high area moment of inertia so that bending stresses occurring at the arms 2 are reduced.

If the three-point suspension link 1 is used in a vehicle, loads act upon the bearings which are connected to the load-introducing elements 5. Loads act on the bearing which is connected to the central load-introducing element 6. Accordingly, tensile stresses, compressive stresses and bending stresses occur in the three-point suspension link 1. The tensile stresses and compressive stresses are accommodated by the stabilization layer 7 and by the supporting winding 9. The three-point suspension link 1 shown here is advantageous in that it has a high potential for lightweight construction because its mass is appreciably smaller than in a conventional three-point suspension link comprising a metal material.

Figure 4:
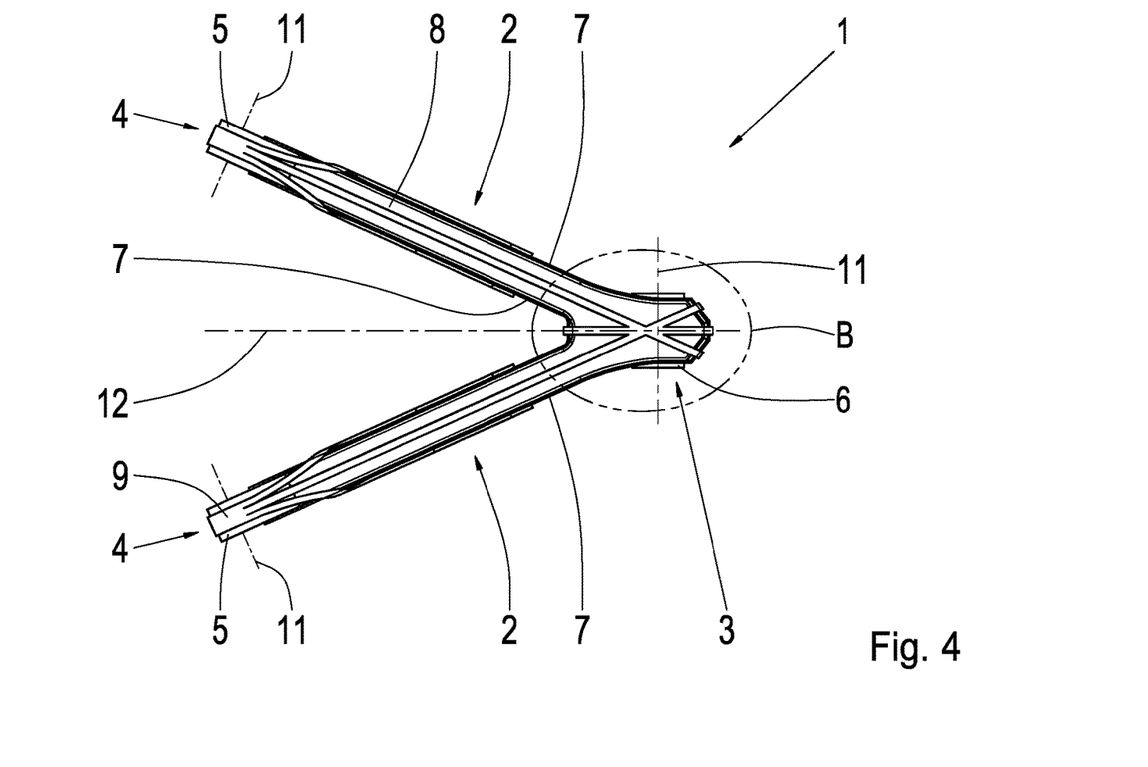
FIG. 4 is a schematic diagram of a three-point suspension link according to a further embodiment example.

FIG. 4 shows a schematic diagram of a three-point suspension link 1 according to a further embodiment example. The three-point suspension link 1 is shown in a top view. The three-point suspension link 1 has the same components as the three-point suspension link from FIGS. 1 to 3, namely a core element 8, two load-introducing elements 5, a central load-introducing element 6, a three-part stabilization layer 7 and a supporting winding 9. The three-point suspension link 1 has two bearing areas 4, the central bearing area 3 and two arms 2. The stabilization layer 7 is formed as a laminate. The arrangement, shape and connections of these components with respect to one another are the same as in FIGS. 1 to 3. However, the core element 8 shown here and the supporting winding 9 shown are formed differently, which is shown even more clearly in enlargement area B in FIG. 5.

The core element 8 forms the basic form of the three-point suspension link 1. A first arm 2 has a first bearing area 4. A second arm 2 has a second bearing area 4. Each arm 2 is connected to the central bearing area 3. Each bearing area 4 limits its corresponding arm 2 toward a side opposite the central bearing area 3. The three-point suspension link 1 is formed symmetrical to a central plane of which only a central axis 12 is shown here. The three-point suspension link 1 has two cover surfaces and a lateral surface. The core element 8 is formed from a plastic foam material. The connection of the core element 8 to the load-introducing elements 5 and the central load-introducing element 6 and to the stabilization layer 7 is like that shown in FIGS. 1 to 3.

In the central bearing area 3, the core element 8 has three surfaces at its side remote of the bearing areas 4. These surfaces are winding aids. These surfaces are perpendicular to the plane that is defined by the bearing axes 11 of the load-introducing elements 5 and of the central load-introducing element 6. A first surface of these surfaces is parallel to the bearing axis 11 of the bearing receptacle 14 of the first load-introducing element 5. A second surface of these surfaces is parallel to the bearing axis 11 of the bearing receptacle 14 of the second load-introducing element 5. A third surface of these surfaces is parallel to the bearing axis 11 of the bearing receptacle 14 of the central load-introducing element 6. This third surface is appreciably smaller than in FIG. 1 and FIG. 3. These three surfaces are at angles relative to one another. As a result of this arrangement of the surfaces relative to one another, the fiber strands of the supporting winding 9 are selectively guided and deflected.

The supporting winding 9 is formed from an FRP. It can be clearly discerned that the supporting winding 9 surrounds the core element 8, the stabilization layer 7, the load-introducing elements 5 and the central load-introducing element 6 in a subarea. That is, the supporting winding 9 is wrapped around the stabilization layer 7, around the load-introducing elements 5 and around the central load-introducing element 6. The supporting winding 9 additionally fixes the stabilization layer 7 in its position. A fiber strand of the supporting winding 9 shown here runs at each arm 2 in a parallel and elongated manner to this arm 2. It will be understood that a plurality of fiber strands of the supporting winding 9 at each arm 2 runs in a parallel and elongated manner to this arm 2. However, for the sake of clarity, only one fiber strand is shown. A fiber strand of the supporting winding 9 runs perpendicular to the bearing axis 11 of the bearing receptacle 14 of the central load-introducing element 6 and, accordingly, in the central plane, of which the central axis 12 is shown. This is made possible by the shape of the central bearing area 3 by the three surfaces. The fiber strands of the supporting winding 9 are oriented in load direction. Due to the stabilization layer 7 and the supporting winding 9 which are connected to one another at the arms 2 of the three-point suspension link 1, the three point suspension link 1 has a high area moment of inertia so that bending stresses occurring at the arms 2 are reduced.

The three-point suspension link 1 shown here has the same advantages as those described referring to FIG. 3.

Figure 5:
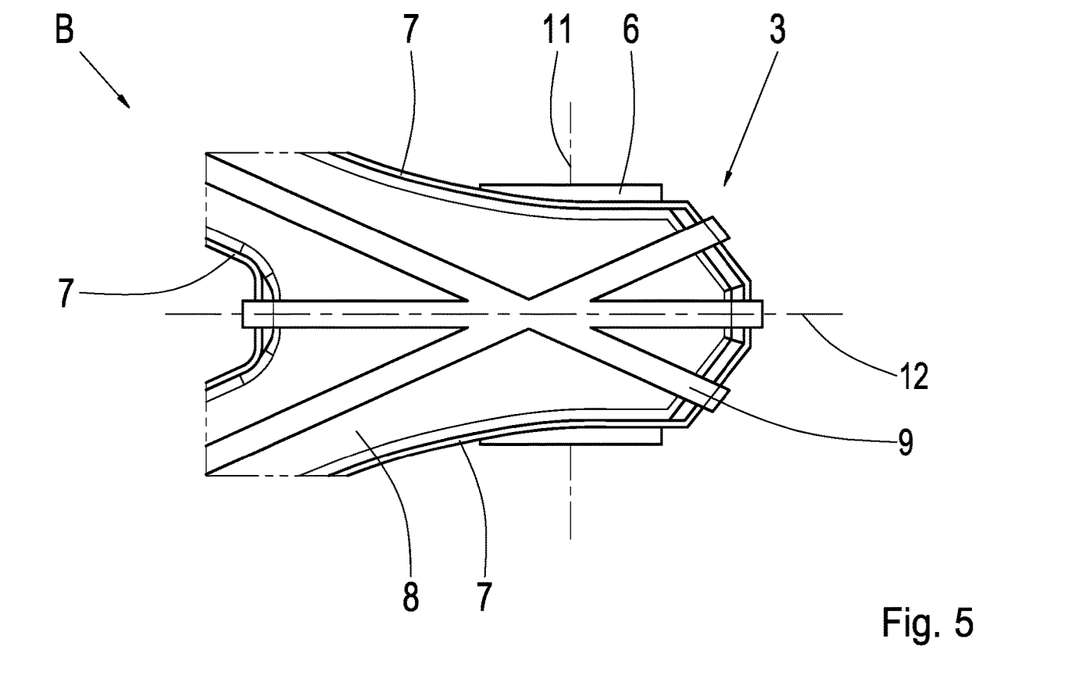
FIG. 5 is a schematic detailed view of the enlargement area B from FIG. 4.

FIG. 5 shows a schematic detailed diagram of enlargement area B from FIG. 4. It can be clearly discerned that the three surfaces of the core element 8 serve to selectively deflect the fiber strands of the supporting winding 9. The surfaces are winding aids. Further, the course of the fiber strands of the supporting winding 9 relative to one another and relative to the core element 8 are shown. The three-point suspension link 1 is shown in a highly schematic manner. After the three-point suspension link is finished, the supporting winding 9 is thick-walled and substantially closed.

The examples shown herein are selected to be exemplary only. For example, the core structure can be constructed so as to be detachable so that it can be dissolved away from the three-point suspension link after the latter is cured, and a material-free core element is provided.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A three-point suspension link for a chassis of a vehicle comprising:
a core structure having two arms and a central bearing area; each of said two arms having a bearing area, the core structure being symmetrical to a central plane having therein a central axis of the core structure;
two load-introducing elements, one of said load-introducing elements arranged at each of said bearing areas;
a central load-introducing element, arranged at said central bearing area, and having a bearing receptacle of a circular cross-section and having a bearing axis, said bearing axis of the bearing receptacle of the central load-introducing element being perpendicular to the central axis of the core structure;
a stabilization layer formed of at least two parts;
a core element surrounded by said stabilization layer in a subarea; and
a supporting winding surrounding said load-introducing elements, said central load-introducing element said stabilization layer and said core element in a subarea,
wherein said stabilization layer and said supporting winding are formed from a fiber reinforced plastic composite material, and
wherein said load-introducing elements and said central load-introducing element have the same orientation.

2. The three-point suspension link according to claim 1, wherein said stabilization layer comprises fiber strands having a unidirectional fiber direction oriented from said bearing areas to said central bearing area.

3. The three-point suspension link according to claim 1, wherein a first part of said stabilization layer extends from a first of said bearing areas to said central bearing area, and a second part of said stabilization layer extends from a second of said bearing areas to said central bearing area.

4. The three-point suspension link according to claim 3, wherein a third part of said stabilization layer extends from said first bearing area to said second bearing area.

5. The three-point suspension link according to claim 1, wherein said central load-introducing element and said two load-introducing elements are formed from a metal material.

6. The three-point suspension link according to claim 1, wherein said central load-introducing element and said two load-introducing elements are formed from a fiber reinforced plastic composite material.

7. The three-point suspension link according to claim 1, wherein said fiber strands of said supporting winding run in the area of said two arms in a parallel and elongated manner to said respective arm.

8. The three-point suspension link according to claim 1, wherein said core element is formed from a plastic foam material.

9. The three-point suspension link claim 1, wherein said core element is formed from a metal foam material.

10. The three-point suspension link according to claim 1, wherein said core element is formed free of material.

11. A method for making a three-point suspension link for a chassis of a vehicle having: a core structure having two arms and a central bearing area, the core structure being symmetrical to a central plane having therein a central axis of the core structure; each of said two arms having a bearing area; two load-introducing elements, one of said load-introducing elements arranged at each of said bearing areas; a central load-introducing element, arranged at said central bearing area, and having a bearing receptacle of a circular cross-section and having a bearing axis, said bearing axis of the bearing receptacle of the central load-introducing element being perpendicular to the central axis of the core structure; a stabilization layer; a core element surrounded by said stabilization layer in a subarea; and a supporting winding surrounding said load-introducing elements, in a subarea said central load-introducing element said stabilization layer and said core element; and said stabilization layer and said supporting winding formed from a fiber reinforced plastic composite material, said method comprising:

provides a core structure;

arranging each load-introducing element at one of said bearing areas and integrating said load-introducing element into said core structure;

arranging said central load-introducing element at said central bearing area and integrating said central load-introducing element into said core structure such that said load-introducing elements and said central load-introducing element have the same orientation;

connecting said stabilization layer to said core structure so as to surround said core structure in a subarea, wherein the connecting step is performed by an adhesive connection;

winding said supporting winding around said core structure, said stabilization layer, said load-introducing elements and said central load-introducing element so as to fix said stabilization layers in position; and guiding said supporting winding so that fiber strands of said supporting winding in the area of said arms run in parallel and elongated manner to said respective arms; and curing said three-point suspension link.

12. The method according to claim 11, wherein said stabilization layer is wet when connected to said core structure.

13. The method according to claim 11, wherein said stabilization layer is cured when connecting to said core structure.

14. The method according to claim 11, wherein said supporting winding is wound by a three-dimensional winding process.

15. The method according to claim 11, further providing winding aids at said core structure so that the fiber strands of said supporting winding are selectively deflected with predetermined spacing during the winding step.

16. The method according to claim 11, comprising forming said core structure such that said core structure remains in said three-point suspension link after said curing of said three-point suspension link so that said core structure forms a core element of said three-point suspension link.

17. The method according to claim 11, comprising forming said core structure to be soluble, and disengaging said core structure from said three-point suspension link after said three-point suspension link is cured so that a material-free core element is formed.

\* \* \* \* \*